United States Patent
Kaneko et al.

(10) Patent No.: US 7,006,262 B2
(45) Date of Patent: Feb. 28, 2006

(54) READING OF INFORMATION BY BIDIRECTIONAL SCANNING USING IMAGE READING/PRINTING APPARATUS

(75) Inventors: Kiyoshi Kaneko, Kanagawa (JP); Tadashi Yamamoto, Kanagawa (JP); Akihiko Nakatani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 876 days.

(21) Appl. No.: 09/966,784

(22) Filed: Sep. 28, 2001

(65) Prior Publication Data

US 2003/0063329 A1    Apr. 3, 2003

(51) Int. Cl.
H04N 1/024 (2006.01)
H04N 1/04 (2006.01)

(52) U.S. Cl. ............ 358/472; 358/474; 358/486; 358/497; 358/296

(58) Field of Classification Search ........... 358/472, 358/296, 497, 494, 473, 406, 471, 474, 486, 358/401; 347/19, 3, 37, 49, 87, 84
See application file for complete search history.

(56) References Cited

U.S. PATENT DOCUMENTS

| | | | |
|---|---|---|---|
| 5,519,415 A * | 5/1996 | Raskin | 347/9 |
| 5,987,186 A * | 11/1999 | Oida et al. | 382/274 |
| 6,091,514 A * | 7/2000 | Hasegawa et al. | 358/296 |
| 6,295,386 B1 * | 9/2001 | Ryu | 382/294 |
| 6,318,836 B1 * | 11/2001 | Hasegawa et al. | 347/33 |
| 6,388,774 B1 * | 5/2002 | Kurata et al. | 358/474 |
| 6,390,588 B1 * | 5/2002 | Ikeda | 347/17 |
| 6,511,141 B1 * | 1/2003 | Hasegawa et al. | 347/3 |
| 6,612,681 B1 * | 9/2003 | Hasegawa et al. | 347/22 |

FOREIGN PATENT DOCUMENTS

| | | |
|---|---|---|
| JP | 64-020832 | 1/1989 |
| JP | 02-021711 | 1/1990 |
| JP | 02-021712 | 1/1990 |

* cited by examiner

Primary Examiner—Cheukfan Lee
(74) Attorney, Agent, or Firm—Morgan & Finnegan, LLP

(57) ABSTRACT

Disclosed is an information reading/printing apparatus in which a carriage supports and moves a printing unit for printing information on a printing medium and a reading unit for reading information. The position of the carriage moved in each of left-to-right and right-to-left directions is detected.

22 Claims, 10 Drawing Sheets

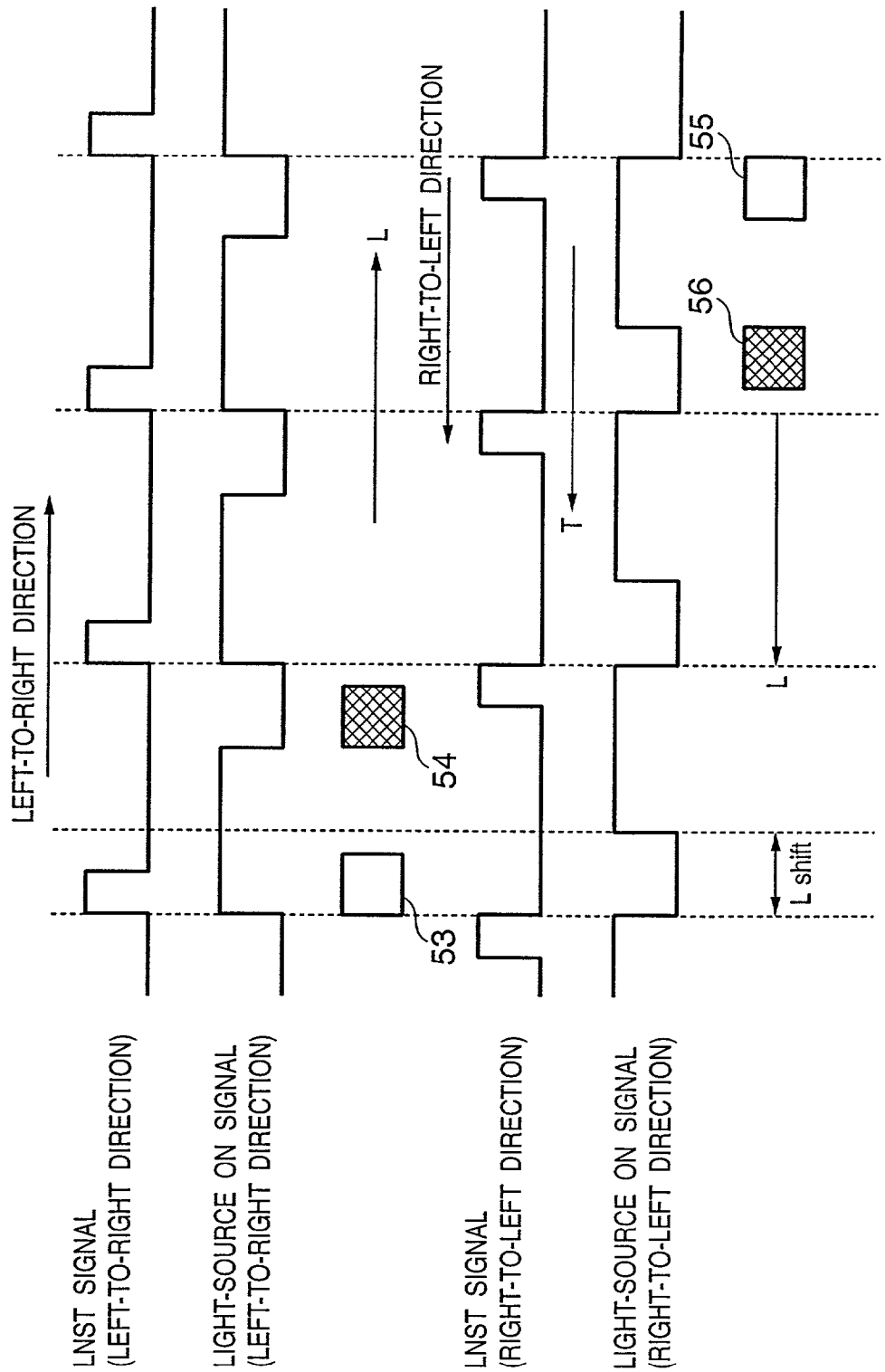

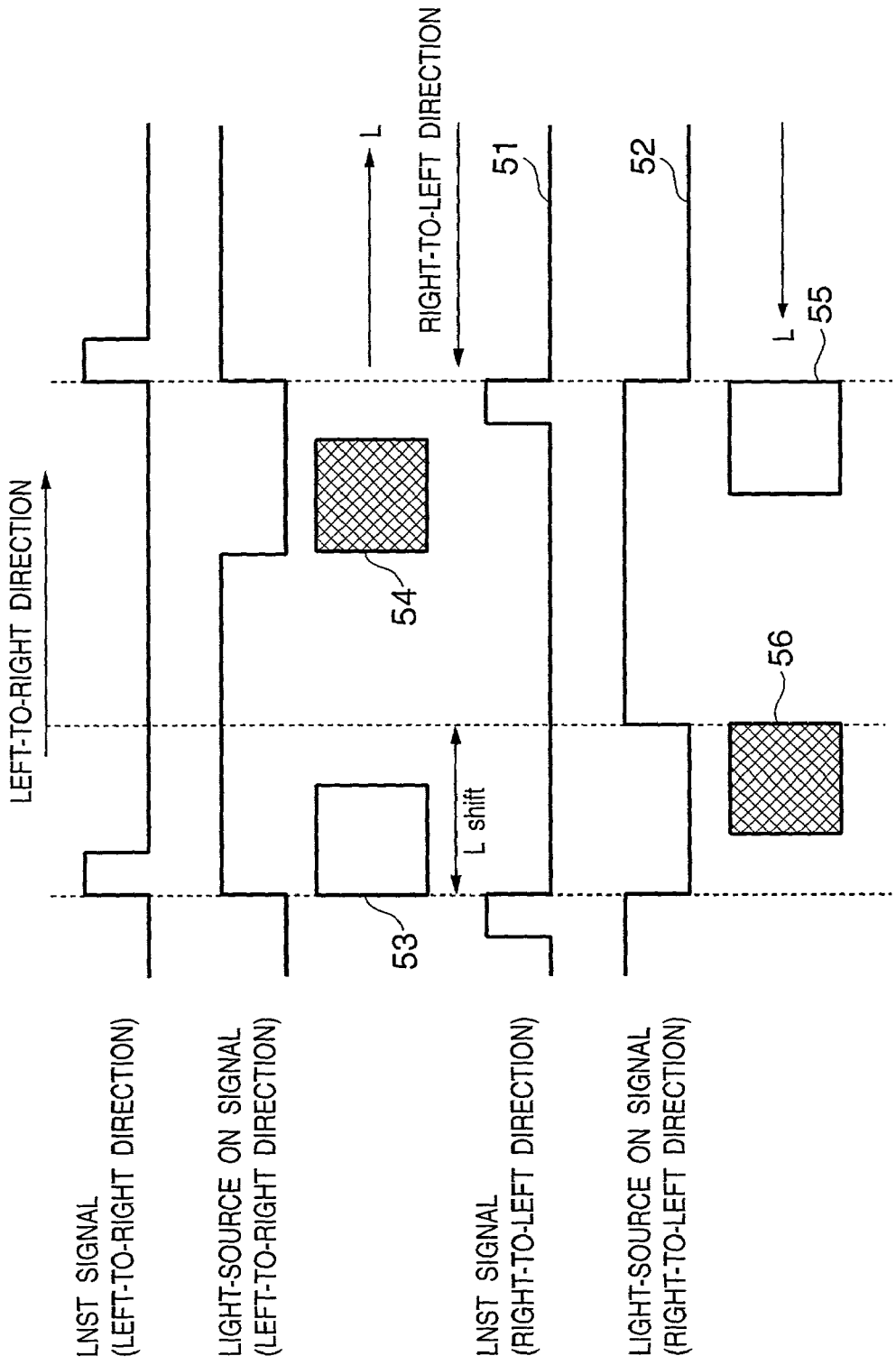

READING OF INFORMATION BY BIDIRECTIONAL SCANNING USING IMAGE READING/PRINTING APPARATUS

FIELD OF THE INVENTION

This invention relates to an image reading/printing apparatus and image reading method in which a printing function and a reading function can be implemented selectively. More particularly, the invention relates to reading of information by bidirectional scanning in an image reading/printing apparatus in which a printing function and a reading function can be implemented selectively.

BACKGROUND OF THE INVENTION

As described in the specifications of Japanese Patent Publication Nos. 1-20832, 2-21712 and 2-21711, there is known an image reading/printing apparatus in which an image printing function and an image reading function (scanner function) are capable of being implemented selectively by removably mounting an image reading unit and an image printing unit on a carriage possessed by the main body of the apparatus.

In a conventional image reading/printing apparatus of this kind, the position to which the carriage has been moved is estimated from the rotational speed or rotational angle of the motor that moves the carriage. Further, the direction in which the carriage is moved in a case where a reading operation is performed by this conventional image reading/printing apparatus is a single direction.

Since the position to which the carriage has been moved is estimated from the rotational speed or angle of the motor in the example of the prior art described above, the following problems arise:

First, a deviation in the physical dimensions of the motor proper is reflected directly in positional precision and makes it difficult to achieve high positional precision.

Second, information relating to a position to which the carriage has been moved does not indicate the position to which the carriage was actually moved previously but is estimation information indicating the estimated position. If position deviates because of some external disturbance, therefore, the apparatus will operate as is in the deviated state and a complicated operation to eliminate the problem must be performed separately.

As a consequence, if the image reading unit is mounted and the apparatus is operated as an image reading apparatus, the image reading position is not obtained with high precision.

Further, when image reading is performed in the prior art, the carriage is moved in only one direction to carry out reading, as a result of which image reading time is prolonged.

SUMMARY OF THE INVENTION

The present invention has been devised in consideration of the foregoing circumstances and its object is to shorten information reading time greatly in an image reading/printing apparatus.

Another object of the present invention is to so arrange it that information reading position when scanning is performed in two directions can be controlled more accurately.

According to the present invention, the foregoing objects are attained by providing an information reading/printing apparatus comprising: a printing unit for printing information on a printing medium; a reading unit for reading information; a carriage for supporting and moving the printing unit and the reading unit; and a position detector for detecting movement position of the carriage in left-to-right and right-to-left directions.

According to the present invention, the foregoing objects are attained by providing an information reading apparatus comprising: a reading unit for reading information; a carriage for supporting and moving the reading unit; and a position detector for detecting movement position of the carriage in left-to-right and right-to-left directions.

According to the present invention, the foregoing objects are attained by providing an information reading method comprising a step of detecting, in left-to-right and right-to-left directions, movement position of a carriage that supports and moves a reading unit for reading information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a timing chart useful in describing reading-timing error when bidirectional scanning is performed in the information reading/printing apparatus according to the first embodiment of the present invention; and FIG. 10 is a timing chart useful in describing reading-timing error when bidirectional scanning is performed at a different resolution in the information reading/printing apparatus according to the first embodiment of the present invention.

DESCRIPTION OF THE PREFERRED EMBODIMENTS

Preferred embodiments of the present invention will be described in detail in accordance with the accompanying drawings.

(First Embodiment)

A first embodiment of the present invention will be described with reference to FIGS. 1 to 10.

Figure 1:
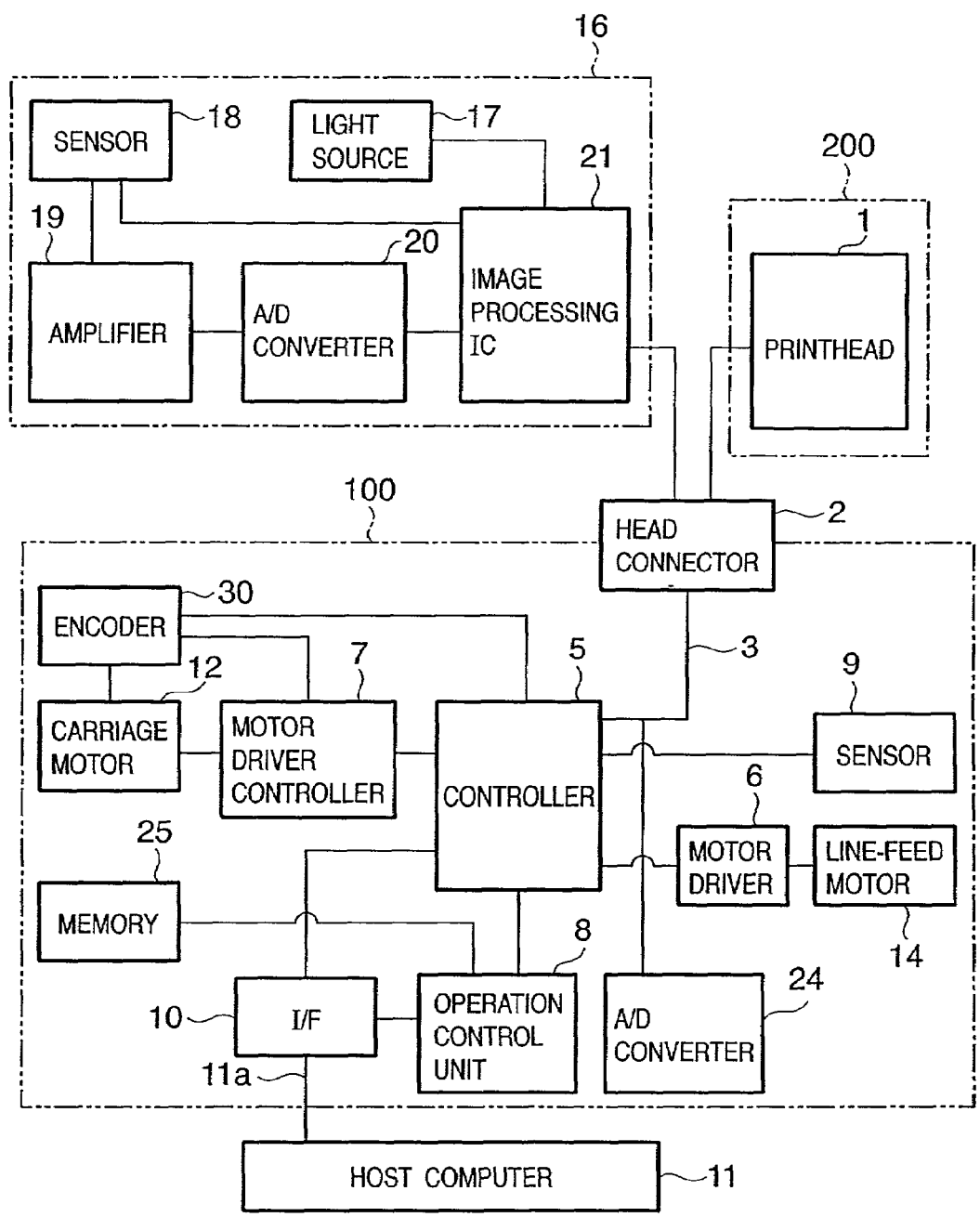
FIG. 1 is a block diagram illustrating the overall structure of an information reading/printing apparatus according to a first embodiment of the present invention.

FIG. 1 is a block diagram illustrating the overall structure of an information reading/printing apparatus according to a first embodiment of the present invention. Shown are the main body 100 of the apparatus, a printing unit 200, a scanner unit 16 and a host computer 11.

The main body 100 includes a head connector 2, a controller 5, a motor driver 6, a motor driver controller 7, an operation control unit 8 for performing overall control of the entire apparatus, a sensor 9, an interface (I/F) 10, a carriage motor 12 for driving a carriage (will be described later), a line-feed motor 14 for conveying a document to be read, printing paper, or the like, an A/D converter 24, a memory 25 and an encoder 30. Connected to the operation control unit 8 is the interface 10, which is connected to the external host computer 11 via cable 11a.

The printing unit 200 has a printhead 1 of the inkjet type, by way of example. The printhead 1 is removably connected to the head connector 2.

The scanner unit 16, which has a light source 17, a sensor 18, an amplifier 19, an A/D converter 20 and an image processing IC 21, is removably connected to the head connector 2.

Described next will be an overview of a printing operation in a case where the information reading/printing apparatus of this embodiment functions as an information printing apparatus.

Print data used to print text, image or other information (simply referred to as "information" below) is transferred from the host computer 11 to the apparatus main body 100 via the interface 10 while control is exercised by the host computer 11 and operation control unit 8.

The controller 5 is connected to the interface 10 and the transferred print data is sent to the controller 5. The latter manipulates the print data to data that the printhead 1 is capable of printing on printing paper. The head connector 2, on which the printhead 1 and scanner unit 16 are capable of being removably mounted, is connected to the controller 5 via a head connecting line 3. The print data that has been manipulated in the controller 5 is sent to the printhead 1 via the head connecting line 3 and head connector 2. The printhead 1 prints information on the printing paper in accordance with the sent print data.

The operation of the mechanism at the time of printing described above will now be described with reference to FIGS. 1 and 2.

Figure 2:
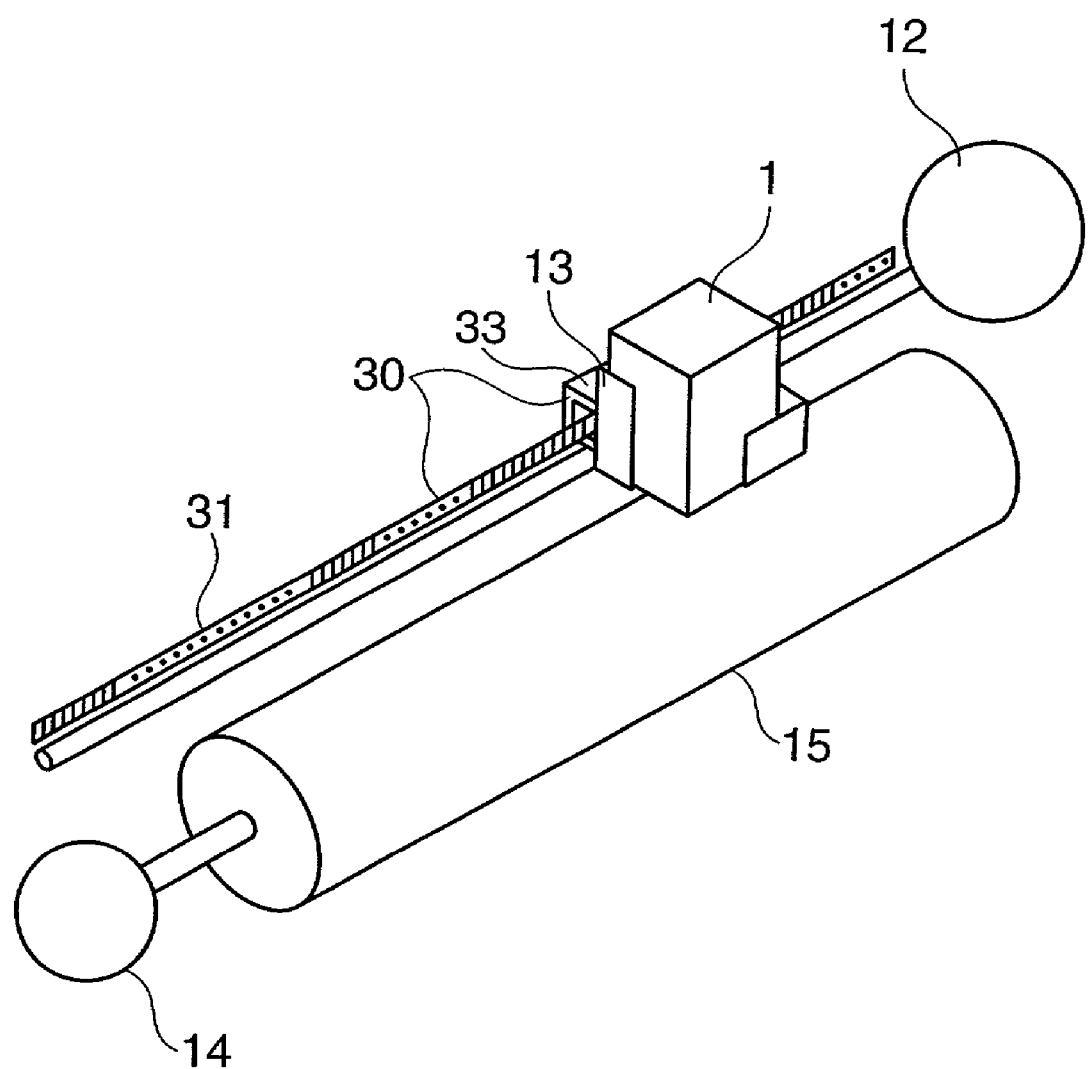
FIG. 2 is a schematic perspective view showing the principal components of the mechanism of the information reading/printing apparatus according to the first embodiment of the present invention.
Figure 3:
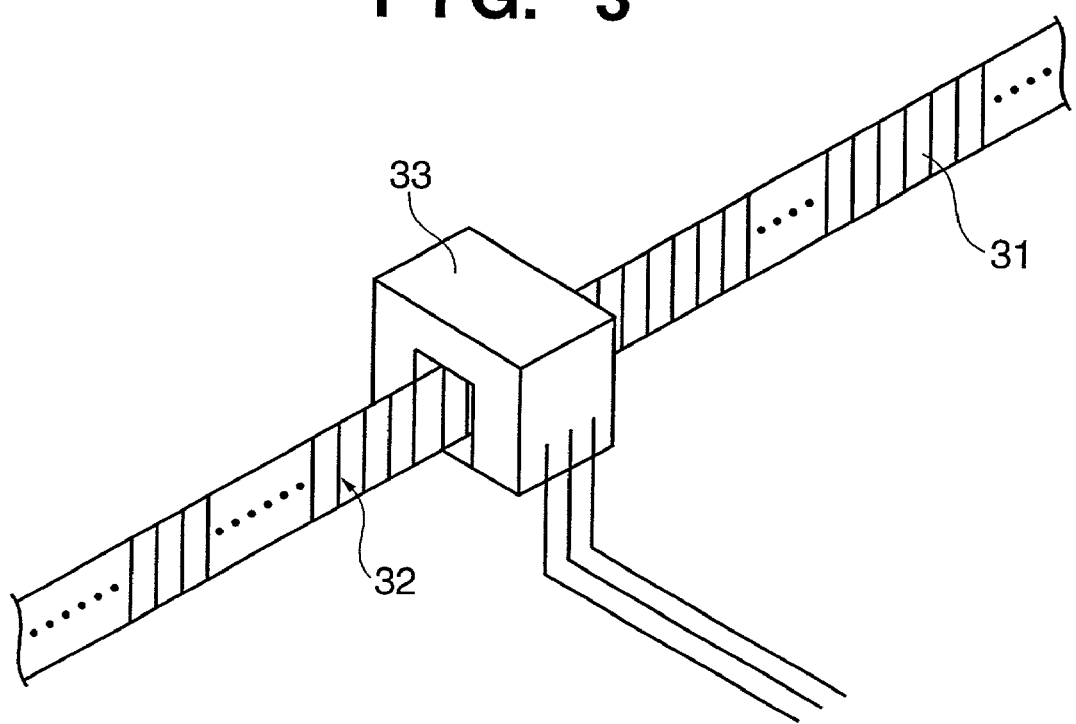
FIG. 3 is a perspective view showing the structure of an encoder in the information reading/printing apparatus according to the first embodiment of the present invention.

FIG. 2 is a schematic perspective view illustrating the principal components of the mechanism. Printing paper is brought into contact with a cylindrical platen 15. The platen 15 feeds the paper by being rotated by a drive mechanism (line-feed motor 14, gears (not shown), etc.) controlled by the operation control unit 8, controller 5 and motor driver 6, and supports the printing paper.

A base-like carriage 13 in close proximity to the circumferential surface of the platen 15 is disposed so as to be free to move along the axial direction of the platen 15. The printhead 1 is mounted on the carriage 13 when information is to be printed and the scanner unit 16, described later, is mounted on the carriage 13 when information is to be read.

The carriage 13 transports the mounted printhead 1 or scanner unit 16 along the surface of printing paper or the surface of a document whose information is to be read.

The carriage 13 is moved by a carriage drive mechanism (not shown) controlled by the operation control unit 8, controller 5 and motor driver controller 7. Whether or not the printing paper or document whose information is to be read has been placed on a paper setting base (not shown) and whether the carriage 13 is located at a start position are sensed by a sensor 9.

Information is printed using the mechanism having the structure described above.

Described next will be an overview of an information reading operation in a case where the information reading/printing apparatus of this embodiment functions as an information reading apparatus.

In a case where this apparatus operates as an information reading apparatus, the carriage on which the scanner unit 16 has been mounted scans a document (not shown), whereby the information on the document is read, through an operation similar to the scanning operation performed when printing is performed by the printhead 1. In this case, the light source 17 within the scanner unit 16 irradiates the document, light reflected from the document is sensed by the sensor 18 and the latter outputs an electric signal corresponding to the amount of sensed light. The electric signal output from the sensor 18 is amplified by the amplifier 19 to a level ideal for handling by the A/D converter 20, and the amplified signal is input to the A/D converter 20. The electric signal converted to digital data is subjected to correction processing or image processing such as shading correction processing and binarizing processing by the image processing IC 21 and the processed data is transferred to the apparatus main body 100 as image data.

The image data is sent to the host computer 11 over a path through which the flow is the reverse of that of the print data at the time of printing. That is, the image data is sent from the image processing IC 21 to the host computer 11 via the head connector 2, head connecting line 3, controller 5 and interface 10. At this time the controller 5 converts the format of the image data received from the image processing IC 21 to a format that is easy for the interface 10 to send or to a format that is easy for the host computer 11 to handle, and transfers the data while control is exercised by the operation control unit 8.

The operation of the mechanism when information is read will now be described.

The operation of the mechanism when information is read is substantially similar to that when printing is performed as described above.

Specifically, the document whose image is to be read is placed in contact with the platen 15. In a manner similar to that when printing is performed, the platen 15 feeds the document by being rotated by a drive mechanism (not shown) and supports the document. Furthermore, with the scanner unit 16 mounted thereon, the carriage 13 transports the scanner unit 16 in the main scanning direction along the surface of the document whose information is to be read, whereby the information is read. The carriage 13 is moved by the carriage drive mechanism (not shown) in a manner similar to that when printing is performed. Further, the sensor 9 operates in a manner similar to that described above.

Thus, the operation of the mechanism when reading is performed is similar to that when printing is performed.

Described next will be the operation of the encoder 30 for detecting the position to which the carriage 13 has been moved.

In terms of its optical system, the encoder 30 comprises, by way of example, a transparent scale 31 on which graduations 32 have been formed at a highly precise pitch, and a photo-interrupter 33. The latter generates a signal that is inverted when it passes by a graduation 32. When the encoder 30 having this structure is used, the transparent scale 31 is attached along the travelling direction of the carriage 13 and the photo-interrupter 33 is mounted on the carriage 13 so as to read the transparent scale 31, as shown in FIG. 2.

Figure 4:
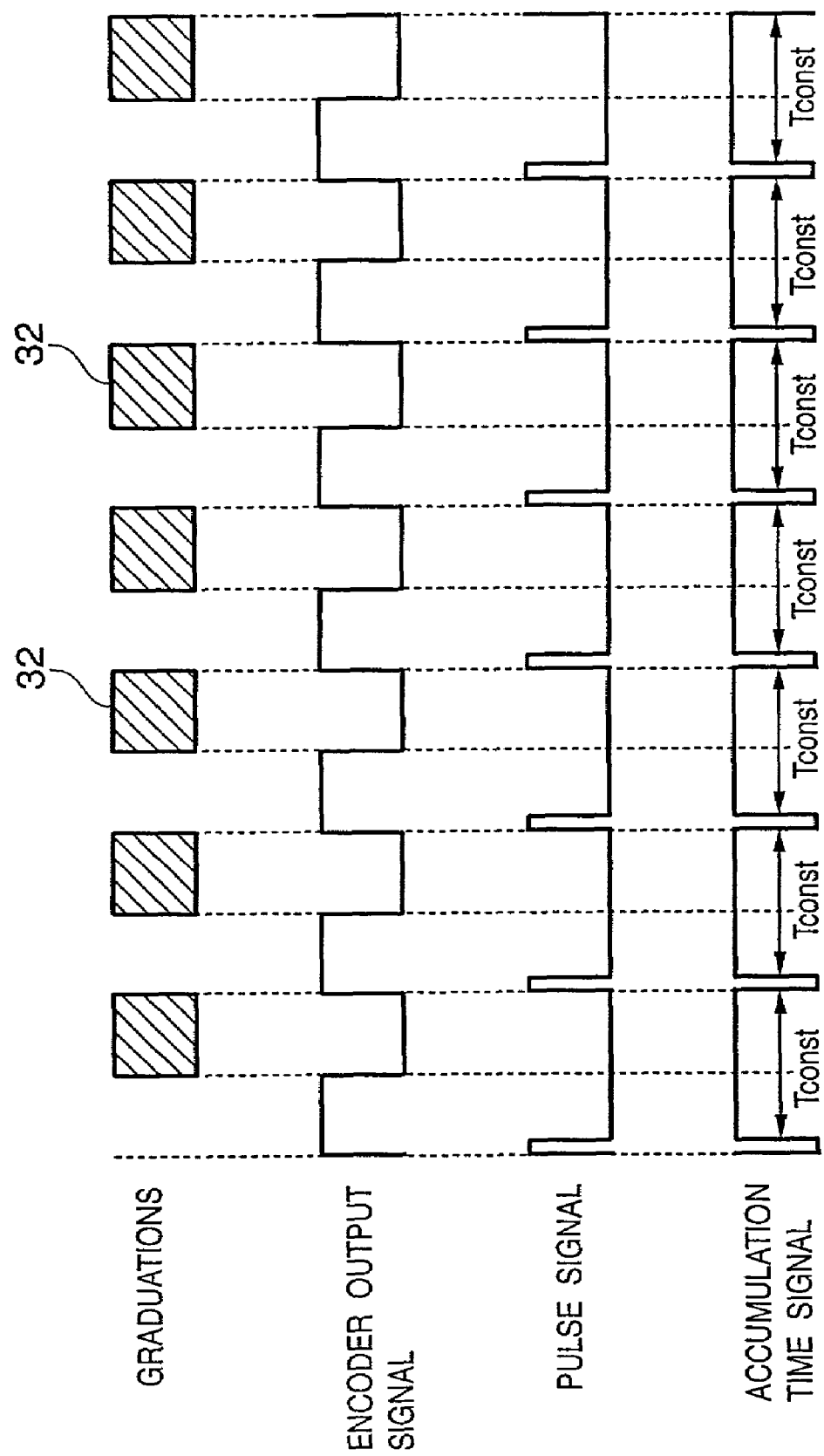
FIG. 4 is a timing chart of signals in the information reading/printing apparatus according to the first embodiment of the present invention.

A signal that indicates the position to which the carriage 13 has been moved will be described in detail with reference to FIG. 4. First, the encoder 30 generates a signal that is inverted from the high (H) to the low (L) level during the time that the photo-interrupter 33 passes by a graduation 32. The signal output from the encoder 30 enters a pulse signal generating block 40 (see FIG. 6) included in the controller 5. The pulse signal generating block 40 generates and outputs a pulse signal upon being triggered by the rising edge of the signal that enters from the encoder 30. The pulse signal is fed back to the motor driver controller 7 to control the carriage motor 12, whereby the carriage 13 can be moved in a stable manner. By utilizing the pulse signal, ink can be discharged with absolute positional precision with respect to the printing medium (printing paper) when the apparatus is operating as an information printing apparatus, and the sensor 9 can read the information on a document with absolute positional precision when the apparatus is operating as an information reading apparatus.

Furthermore, if the operation control unit 8 and controller 5 generate an accumulation time signal of a desired constant duration (Tconst) on a pulse-by-pulse basis when the apparatus operates as an information reading apparatus, accumulation time in the sensor 9 will be rendered constant, as a result of which the reading operation is stabilized. In other words, even if the travelling speed of the carriage 13 becomes unstable because of some external disturbance, the read information exhibits a high precision because the absolute positional relationship between the graduations 32 of the encoder 30 and the sensor 9 is maintained.

By using the encoder 30, the absolute position of the carriage 13 with respect to the image of the document can be ascertained in both the left-to-right and right-to-left directions in a case where the carriage 13 is scanned in two (back-and-forth) directions. As a result, printing and reading can be implemented highly accurately in scanning of the carriage 13 in both travelling directions.

However, owing to the effects of mechanical backlash or the like in the left-to-right and right-to-left directions of carriage 13, some error develops in terms of positional precision. In addition, positional precision develops some error electrically in control along the left-to-right and right-to-left directions.

Figure 5:
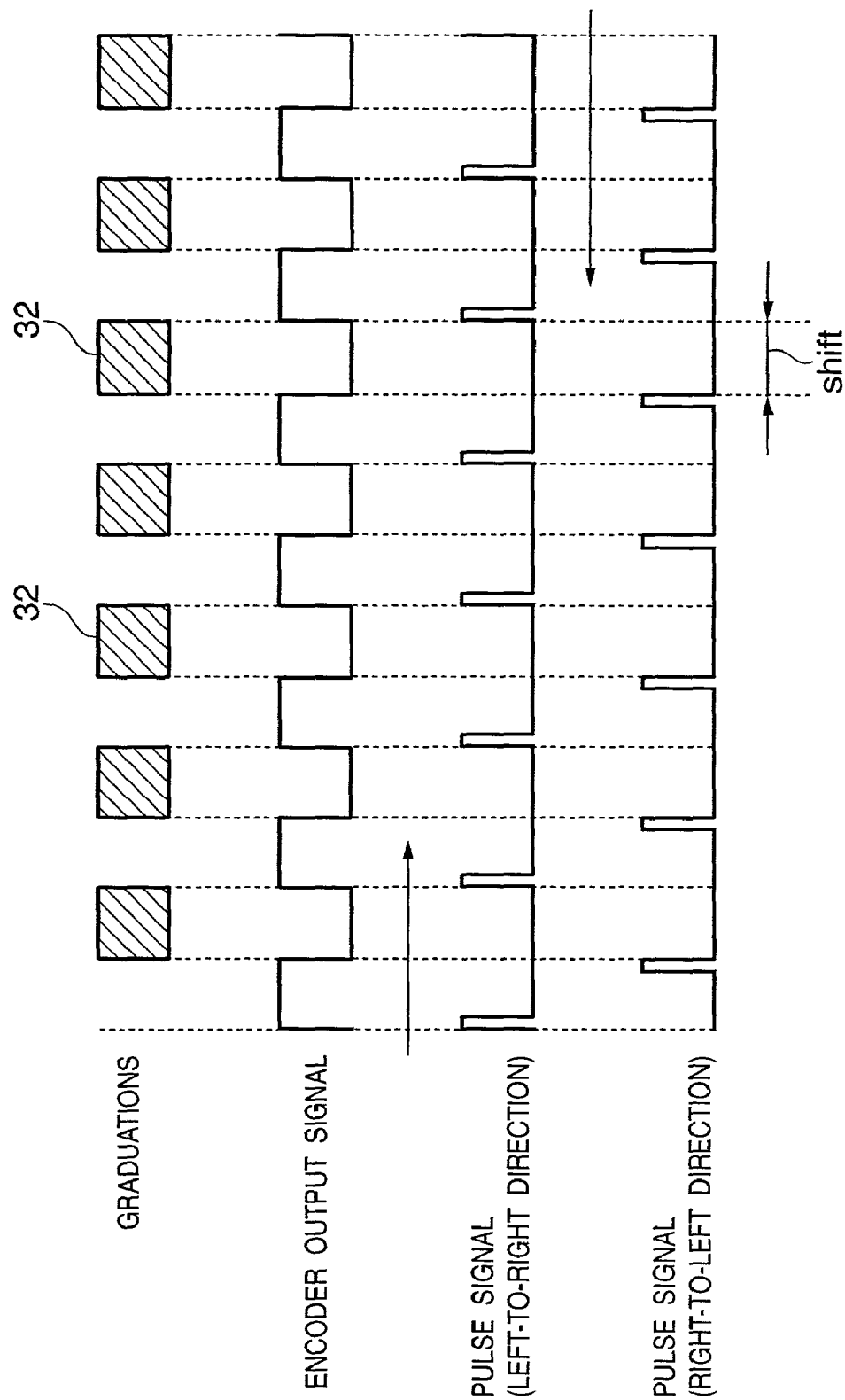
FIG. 5 is a timing chart of signals when bidirectional scanning is performed in the information reading/printing apparatus according to the first embodiment of the present invention.
Figure 6:
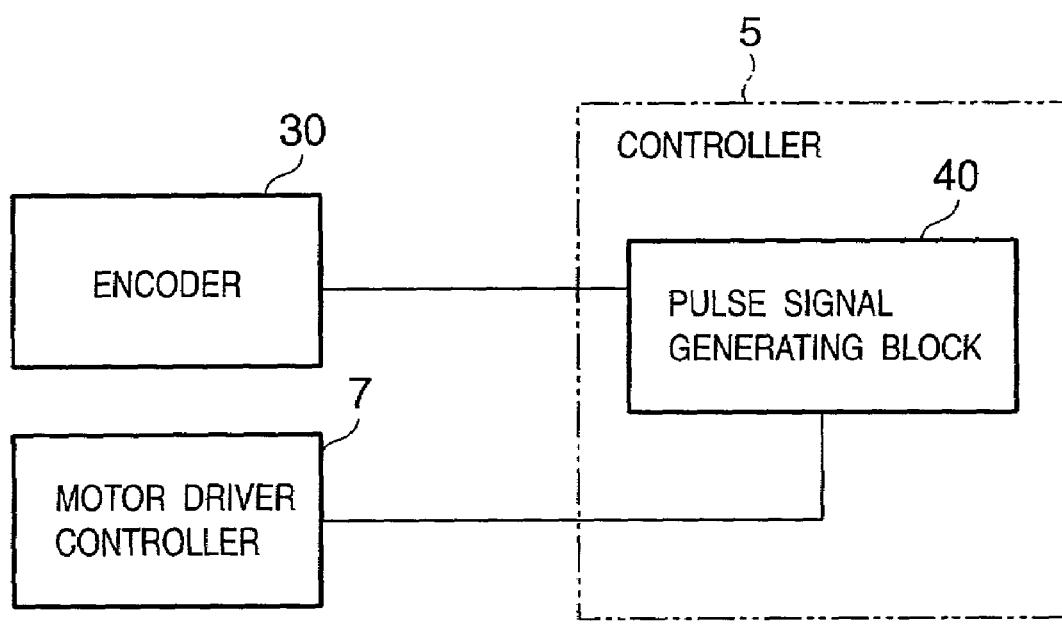
FIG. 6 is a diagram useful in describing components related to pulse signal generation in the information reading/printing apparatus according to the first embodiment of the present invention.

In a case where the graduations 32 and blank portions of the encoder 30 are disposed at approximately equal intervals, as shown in FIG. 5, the encoder 30 will output a pulse signal having a duty ratio of about 50% if the graduations and blank portions are output electrically.

When scanning is performed in back-and-forth directions, basically the output of a pulse signal by the pulse signal generating block 40 of the controller 5 based upon the signal output from the encoder 30 is similar to that described above. Electrically, the pulse signal is generated using the rising edge of the output signal from the encoder 30 as a trigger. In a case where scanning is performed in the left-to-right direction, a pulse signal (left-to-right direction) of the kind shown in FIG. 5 is generated by the pulse signal generating block 40 based upon the output signal of the encoder 30. Next, when scanning is performed in the opposite direction, i.e., the right-to-left direction, now the edge that was the falling edge of the encoder output signal in the left-to-right direction corresponds to the rising edge and therefore a pulse signal (right-to-left direction) shown in FIG. 5 is generated by the pulse signal generating block 40.

Thus, in bidirectional scanning, a phase difference (Tshift) equivalent to half the period of the encoder output signal is produced between the pulse signal for the left-to-right direction and the pulse signal for the right-to-left direction.

In a case where image reading at a resolution of 100 dpi is performed in two directions, for example, the position of the carriage 13 can be adjusted more finely by using an encoder 30 having a resolution several times higher than the information reading resolution (here 100 dpi), such as 200 dpi or 400 dpi, etc. A method of adjusting position will now be described.

Figure 7:
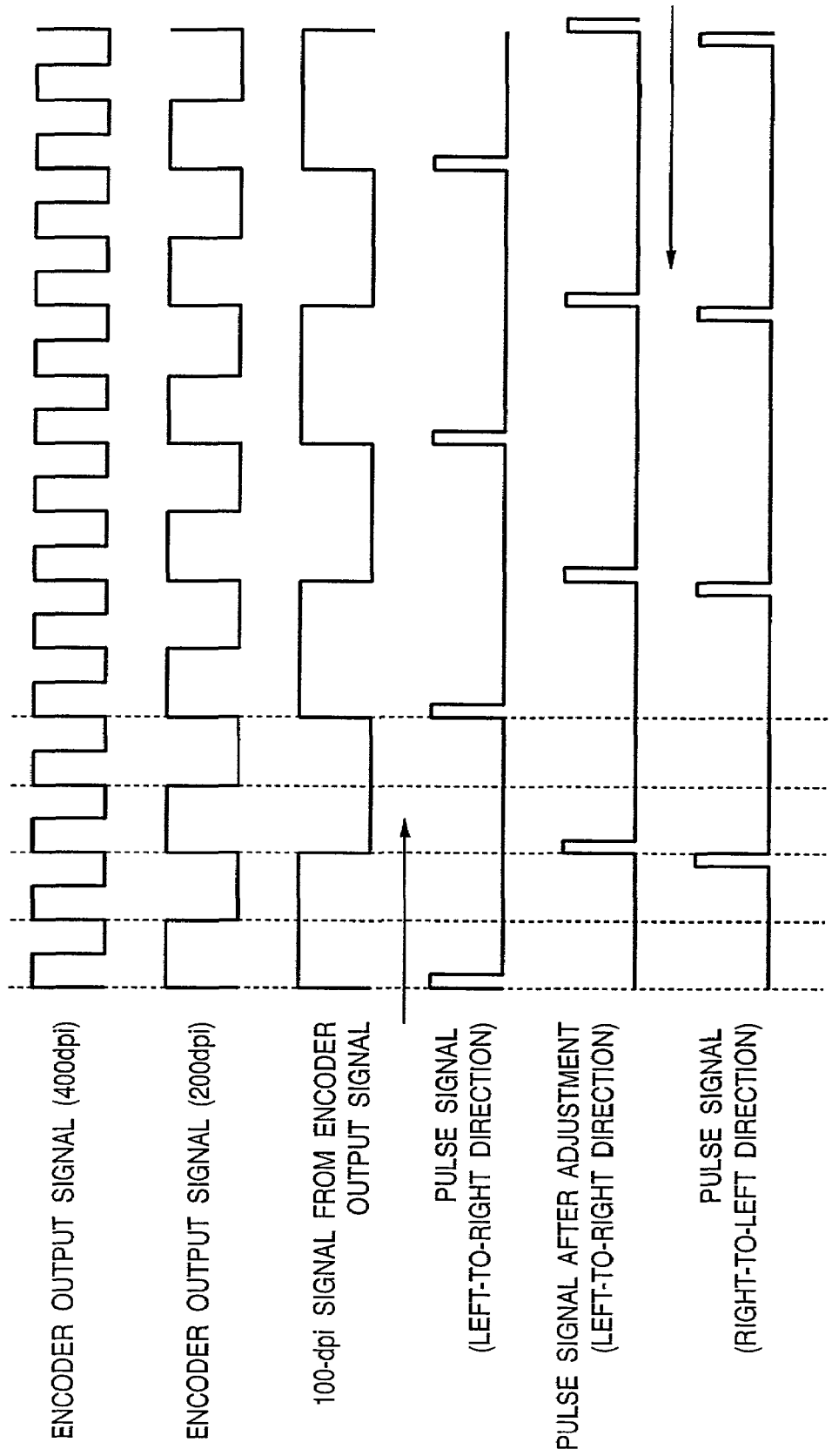
FIG. 7 is a timing chart useful in describing pulse-signal error adjustment when bidirectional scanning is performed in the information reading/printing apparatus according to the first embodiment of the present invention.

If image reading at a resolution of 100 dpi is performed bidirectionally when the encoder 30 has a resolution of 400 dpi, for example, a pulse signal (left-to-right direction) of the kind shown in FIG. 7 is generated at the rising edge of the encoder output signal (100 dpi) when viewed from left to right. Conversely, a pulse signal (right-to-left direction) of the kind shown in FIG. 7 is generated at the rising edge of the encoder output signal (100 dpi) when viewed from right to left. The encoder output signal (100 dpi) is generated by the pulse signal generating block 40 of the controller 5. Accordingly, if bidirectional reading is performed under these conditions as is, reading will take place at a position that is offset by one-half the period at 100 dpi.

Figure 8:
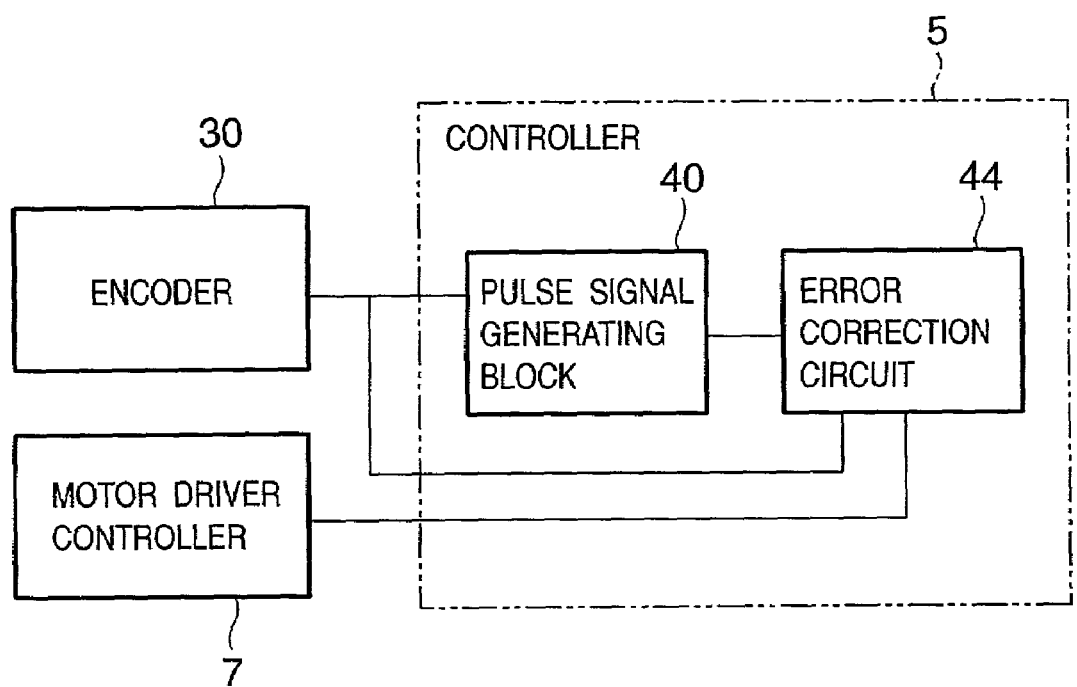
FIG. 8 is a diagram useful in describing components related to pulse signal generation in the information reading/printing apparatus according to the first embodiment of the present invention.

An error correction circuit 44 of the kind shown in FIG. 8 is provided in order to eliminate such error when reading is performed.

The error correction circuit 44, which uses the output signal from the encoder 30 as a clock which is set to 400 dpi by the operation control unit 8, subjects the pulse signal (left-to-right direction) output from the pulse signal generating block 40 to an error adjustment. For example, if a shift adjustment equivalent to two clock pulses is made, then the pulse signal (left-to-right direction) after the adjustment will be as shown in FIG. 7. The error adjustment can be achieved by similarly shifting the pulse signal for the right-to-left direction instead of the pulse signal for the left-to-right direction.

As described above, a deviation equivalent to onehalf a period is dealt with by correcting the phase difference between the left-to-right and right-to-left directions. By virtue of this correction, approximately the same location in the main scanning direction is read by scanning in both the left-to-right and right-to-left directions and bidirectional reading can be achieved without any deviation in position.

Further, in a case where read image data is stored in the memory 25 in the order in which it is read in bidirectional scanning, whereas the starting position in the left-to-right direction is the left edge of the document, the starting position in the right-to-left direction is the right edge of the document. As a consequence, the array of the image data stored in memory 25 will be in one direction when reading is performed in the left-to-right direction and in the opposite direction when reading is performed in the right-to-left direction. In order to prevent this, the read data obtained by reading in the right-to-left direction should be stored in a direction that is opposite that of the left-to-right direction by controlling the addressing of the memory 25. If the data is stored in this manner, then data that matches the information on the document can be stored and subsequent data processing also can be executed without complications.

The description rendered above is a method of correcting reading position error, which is due to the difference in the travelling direction (left-to-right and right-to-left directions) of the carriage 13, when the apparatus is used as an information reading apparatus.

Positional error is performed in a method similar to that set forth above also in a case where the apparatus is used as an information printing apparatus. In order to perform printing highly precisely in both the left-to-right and right-to-left directions while the carriage 13 is being moved bidirectionally for information printing purposes, it is necessary to correct error produced by mechanical backlash or the like as well as electrical error for the same reasons as set forth above.

If the apparatus operates as an information printing apparatus, the degree to which positional error is to be corrected is decided based upon the result of printing ruled lines or the like, and the position at which the pulse signal (the information-reading period signal at the time of the reading operation and the printing period signal at the time of the printing operation) is generated can be adjusted using the clock in the manner described above.

This adjustment is performed by adjusting the phase shift between the left-to-right and right-to-left directions in bidirectional travel of the carriage 13 using the basic arrangement relating to the printing operation.

Accordingly, with the apparatus being used as an information printing apparatus, the result of performing the adjustment of positional error correction when the carriage 13 performs printing by being moved bidirectionally is adopted as the result of basic bidirectional adjustment of the apparatus. Then, with the apparatus being used as information reading apparatus, the correction of positional error in bidirectional reading is performed and an adjustment is made based upon the above-mentioned result, whereby highly precise bidirectional reading of information can be achieved.

With this basic bidirectional adjustment, it is possible to adjust for the above-mentioned mechanical and electrical factors and for a positional error factor specific to the printhead 1 when the apparatus is used as an information printing apparatus.

In a case where a bidirectional adjustment is made with the apparatus functioning as an information reading apparatus after the above-described basic bidirectional adjustment is carried out, the adjustment is performed adding the error factor specific to the reading unit to the above-mentioned error factors.

The predominant cause of error specific to the reading unit is the method of reading information in this apparatus, namely the method of adopting an actual accumulation time that is shorter than the time of the information reading period or the method of reading information by making the ON time of the light source shorter than the image reading period.

For example, if information is read at 800 dpi in the left-to-right direction (when the resolution of the encoder 30 is 400 dpi as described above with reference to FIG. 7, adjusted pulse signals of 800 dpi can be realised by dividing the period of the signal from the encoder 30 by 4 in the pulse signal generating block 40), the relationship between an LNST signal representing the information reading period (accumulation time) and the light-source ON signal will be as shown in FIG. 9.

The duration of the light-source ON signal (left-to-right direction) shown in FIG. 9 is shorter than that of the LNST signal (left-to-right direction) because the LNST signal (left-to-right direction) is one generated based upon the output signal from the encoder 30. If the horizontal axis is taken as distance (L), as shown in FIG. 9, the signals have an accurate spatial frequency with regard to position. However, if the horizontal axis is taken as a time axis, the signals fluctuate slightly in terms of frequency owing to fluctuation of the travelling speed of carriage 13. For this reason, the information reading operation is performed by turning on the light source 17 only for a period of time during which reading is performed stably.

Accordingly, if it is assumed that the sizes of pixels 53, 54 when reading is performed at 800 dpi are as shown in FIG. 9, then some image information will be lost from the location of pixel 54 onward until the starting position of the next reading cycle.

Conversely, with regard to a case where information is read at 800 dpi when scanning is performed in the right-to-left direction, some image information will be lost from the location of pixel 56 onward until the starting position of the next reading cycle in a manner similar to that when reading is performed in the left-to-right direction.

Accordingly, read information in the left-to-right and right-to-left directions is image information of positions that differ in the left-to-right and right-to-left directions by an amount equivalent to the OFF segment of the light source 17 (amount of shift: Lshift). An adjustment can be made in both directions by setting the shift of pulse signals for reading in the left-to-right and/or right-to-left directions based upon a clock signal generated by dividing the period of the output signal from the encoder 30 so as to match the centers of the read information as much as possible.

According to this embodiment, information is read at a maximum resolution of 800 dpi. Therefore, adjustment would be performed in units of resolution higher than the maximum resolution, e.g., 1600 dpi. Furthermore, an adjustment can be carried out that includes also mechanical error such as mounting error of reading means.

Further, when information is read at 400 dpi, as shown in FIG. 10, ON times of the light source, namely the center points of the read positions, shift between the left-to-right and right-to-left directions for reasons set forth above. Accordingly, the shift is set based on a clock signal generated by dividing the period of the output signal from the encoder 30 and the ON time of the light source is adjusted so as to make the centers of the read positions coincide in a manner similar to that described above.

It should be evident from FIGS. 9 and 10 that the amount of phase for reducing the shift between the centers of the reading positions at each of the resolutions changes with the magnitude of each resolution. Accordingly, the ON time of the light source must be adjusted with regard to the left-to-right direction and/or the right-to-left direction at each resolution.

The operation for achieving this is to perform the error correction by the number of clocks by a setting from the operation control unit 8 using the pulse signal generating block 40, the pulse signal (left-to-right direction), the error correction circuit 44 and the encoder output.

(Second Embodiment)

In the first embodiment set forth above, a bidirectional reading adjustment is described for a case where the printhead 1 of the printing unit 200 in the information printing apparatus is detached from the apparatus main body 100 and the scanner unit 16 is mounted on the main body 100 so that the apparatus will operate as an information reading apparatus. However, the present invention is not limited to this arrangement. The control method of the present invention can be applied also to a case where an information reading apparatus is constructed by mounting the scanner unit 16 on part of the carriage 13 to which the printhead of an information printing apparatus is attached.

Thus, in accordance with the first and second embodiments, as described above, bidirectional reading can be performed at high precision.

The present invention is not limited to the above embodiments and various changes and modifications can be made within the spirit and scope of the present invention. Therefore, to apprise the public of the scope of the present invention, the following claims are made.

What is claimed is:

1. An information reading/printing apparatus comprising:
   a printing unit for printing information on a printing medium;
   a reading unit for reading information;
   a carriage for supporting and moving said printing unit and said reading unit;
   a position detector for detecting movement position of said carriage in left-to-right and right-to-left directions; and
   a data-array correction unit for correcting a discrepancy in an array of data, when information reading data is acquired, caused by a discrepancy in information reading direction between the left-to-right and right-to-left directions.

2. The apparatus according to claim 1, wherein said printing unit and said reading unit are detachably provided on a main body of the apparatus.

3. The apparatus according to claim 1, further comprising an error adjustment unit for adjusting information reading position error that is produced owing to a discrepancy in carriage travelling direction between the left-to-right and right-to-left travelling directions.

4. The apparatus according to claim 3, wherein said position detector includes said error adjustment unit.

5. The apparatus according to claim 3, wherein said error adjustment unit is capable of adjusting the information reading position error using an adjustment resolution for which the minimum unit of resolution is a resolution that is a whole-number multiple of the resolution of said reading unit.

6. The apparatus according to claim 3, further comprising a reading position error correction unit for correcting information reading position error in the left-to-right and right-to-left directions at the time of information reading using said error adjustment unit, taking as a reference a correction position obtained by correcting printing position error produced by printing in the left-to-right direction and printing in the right-to-left direction when said apparatus functions as a printing apparatus.

7. The apparatus according to claim 6, wherein the information reading position error correction is adjusted for every resolution using said reading position error correction unit in reading of information.

8. The apparatus according to claim 1, wherein said position detector includes said data-array correction unit.

9. The apparatus according to claim 1, wherein said reading unit performs an information reading operation in movement of said carriage in the left-to-right and right-to-left directions.

10. The apparatus according to claim 1, wherein said printing unit includes an ink-jet printhead.

11. An information reading apparatus comprising:
    a reading unit for reading information;
    a carriage for supporting and moving said reading unit;
    a position detector for detecting movement position of said carriage in left-to-right and right-to-left directions; and
    a data-array correction unit for correcting a discrepancy in an array of data, when information reading data is acquired, caused by discrepancy in information reading direction between the left-to-right and right-to-left directions.

12. The apparatus according to claim 11, wherein said reading unit is detachably provided on a main body of the apparatus.

13. The apparatus according to claim 11, further comprising an error adjustment unit for adjusting information reading position error that is produced owing to a discrepancy in carriage travelling direction between the left-to-right and right-to-left travelling directions.

14. The apparatus according to claim 13, wherein said position detector includes said error adjustment unit.

15. The apparatus according to claim 13, wherein said error adjustment unit is capable of adjusting the information reading position error using an adjustment resolution for which the minimum unit of resolution is a resolution that is a whole-number multiple of the resolution possessed by said reading unit.

16. The apparatus according to claim 11, wherein said position detector includes said data-array correction unit.

17. The apparatus according to claim 11, wherein said reading unit performs an information reading operation in movement of said carriage in both of the left-to-right and right-to-left directions.

18. An information reading method comprising a step of detecting, in left-to-right and right-to-left directions, movement position of a carriage that supports and moves a reading unit for reading information; and
    a step of correcting a discrepancy in an array of data, when information data is acquired, caused by a discrepancy in information reading direction between the left-to-right and right-to-left directions.

19. The method according to claim 18, wherein said reading unit is detachably provided on a main body of the apparatus.

20. The method according to claim 18, further comprising a step of adjusting information reading position error that is produced owing to a discrepancy in carriage travelling direction between the left-to-right and reverse travelling directions.

21. The method according to claim 20, further comprising a step of adjusting the information reading position error using an adjustment resolution for which the minimum unit of resolution is a resolution that is a whole-number multiple of the resolution possessed by said reading unit.

22. The method according to claim 18, wherein said reading unit performs an information reading operation in movement of said carriage in both of the left-to-right and right-to-left directions.

* * * * *